US007965997B2

(12) United States Patent
Sposato et al.

(10) Patent No.: US 7,965,997 B2
(45) Date of Patent: Jun. 21, 2011

(54) SYSTEM AND METHOD TO SUPPORT MULTIPLE WIRELESS ACCOUNTS FOR A GIVEN SUBSCRIBER

(75) Inventors: Stephen A. Sposato, Lafayette, CA (US); Wayne Robert Heinmiller, Elgin, IL (US); Alicia Marie Russell, Eureka Springs, AR (US); Charles C. Hooper, II, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 296 days.

(21) Appl. No.: 10/899,379

(22) Filed: Jul. 26, 2004

(65) Prior Publication Data

US 2006/0019630 A1  Jan. 26, 2006

(51) Int. Cl.
H04M 11/00 (2006.01)
H04M 15/00 (2006.01)
H04W 4/00 (2009.01)

(52) U.S. Cl. ........ 455/406; 455/405; 455/407; 455/408; 455/433; 455/466; 379/114.01; 379/114.26

(58) Field of Classification Search .......... 455/405–408, 455/433, 466; 379/114.01, 114.21, 114.26, 379/120, 127.06
See application file for complete search history.

(56) References Cited

U.S. PATENT DOCUMENTS

| | | | |
|---|---|---|---|
| 5,241,586 A * | 8/1993 | Wilson et al. | 379/88.11 |
| 5,923,741 A * | 7/1999 | Wright et al. | 379/114.01 |
| 5,950,138 A * | 9/1999 | Norimatsu | 455/551 |
| 6,026,291 A * | 2/2000 | Carlsson et al. | 455/406 |
| 6,169,891 B1 * | 1/2001 | Gorham et al. | 455/408 |
| 6,195,419 B1 * | 2/2001 | Gilboy | 379/114.26 |
| 6,282,274 B1 | 8/2001 | Jain et al. | |
| 6,353,663 B1 * | 3/2002 | Stevens et al. | 379/114.22 |
| 6,473,622 B1 * | 10/2002 | Meuronen | 455/466 |
| 6,741,850 B1 * | 5/2004 | Park | 455/407 |
| 6,757,371 B2 * | 6/2004 | Kim et al. | 379/114.22 |
| 6,781,575 B1 | 8/2004 | Hawkins et al. | |
| 6,925,160 B1 * | 8/2005 | Stevens et al. | 379/121.05 |
| 2002/0022472 A1 * | 2/2002 | Watler et al. | 455/405 |
| 2002/0025028 A1 * | 2/2002 | Manto | 379/114.05 |
| 2002/0072388 A1 * | 6/2002 | Korneluk et al. | 455/551 |

(Continued)

OTHER PUBLICATIONS

International Search Report for International Application No. PCT/US05/24942, mailed on Dec. 2, 2005.

(Continued)

Primary Examiner — Ariel Balaoing
(74) Attorney, Agent, or Firm — Toler Law Group

(57) ABSTRACT

A system and method are disclosed to support multiple wireless account for a given subscriber. A method that incorporates teachings of the present disclosure may include, for example, linking various accounts to a wireless enabled device of a wireless service subscriber. In one embodiment, device addresses like telephone numbers and electronic mail addresses for devices that may call or be called by the subscriber may be associated one of the various accounts. In operation, a call may be completed between the subscriber's wireless enabled device and one of the other devices, and a call metric for the call may be tracked. A billing entry for the call may be generated from the call metric and the call may be charged to an appropriate account selected from the various accounts. The process of determining the appropriate account may include, for example, determining if the device address for the other device is associated with one of the accounts linked to the subscriber's wireless enabled device.

34 Claims, 4 Drawing Sheets

U.S. PATENT DOCUMENTS

| | | | |
|---|---|---|---|
| 2003/0078844 A1* | 4/2003 | Takatori et al. | 705/17 |
| 2003/0112951 A1* | 6/2003 | Brown et al. | 379/210.02 |
| 2003/0128828 A1* | 7/2003 | Clark et al. | 379/116 |
| 2005/0086138 A1* | 4/2005 | Prange | 705/34 |
| 2005/0176421 A1* | 8/2005 | Matenge et al. | 455/426.1 |
| 2005/0190902 A1* | 9/2005 | Benco et al. | 379/114.21 |
| 2008/0219420 A1* | 9/2008 | Gerber | 379/112.01 |

OTHER PUBLICATIONS

Written Opinion of the International Searching Authority for PCT/US05/24942, mailed on Dec. 2, 2005.

* cited by examiner

SYSTEM AND METHOD TO SUPPORT MULTIPLE WIRELESS ACCOUNTS FOR A GIVEN SUBSCRIBER

BACKGROUND

Mobile telephone usage has become increasingly ubiquitous and an essential part of both the personal and professional lives of many users. Unfortunately, individuals who rely on wireless handset technology for both their personal and professional lives often face a recurring accounting problem. While several businesses want their employees to have wireless telephones, most businesses require those same users to ensure that the business is not paying for personal telephone usage.

As such, some users are asked to certify that they will not make personal calls with business phones. Users may also be required to pay their monthly bill and to submit a reimbursement request—including a copy of the bill with reimbursable business calls clearly identified. These techniques often waste both time and money. And, while these techniques may be moderately effective, they include several weaknesses.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Embodiments discussed below describe, in part, approaches for allowing wireless service subscribers to apply different account codes to their respective services. The following discussion focuses, primarily, on an individual user or subscriber based service. The teachings disclosed herein, however, may also be used to provide multiple wireless account management services to groups, enterprises, and/or companies. From a high level, a user may have a single wireless enabled device that is used for both business and personal purposes. As such, the user may want a relatively easy way to distinguish between business and personal calls—whether those calls are placed calls or received calls. In some cases, a user may be employed as a contractor or professional service provider supporting multiple clients at the same time. One or more of these clients may be willing to reimburse the user for cellular costs incurred in connection with providing the client with service. The user may be able to make use of the teachings disclosed herein to facilitate the management of his or her multiple wireless sub-accounts.

Figure 2:
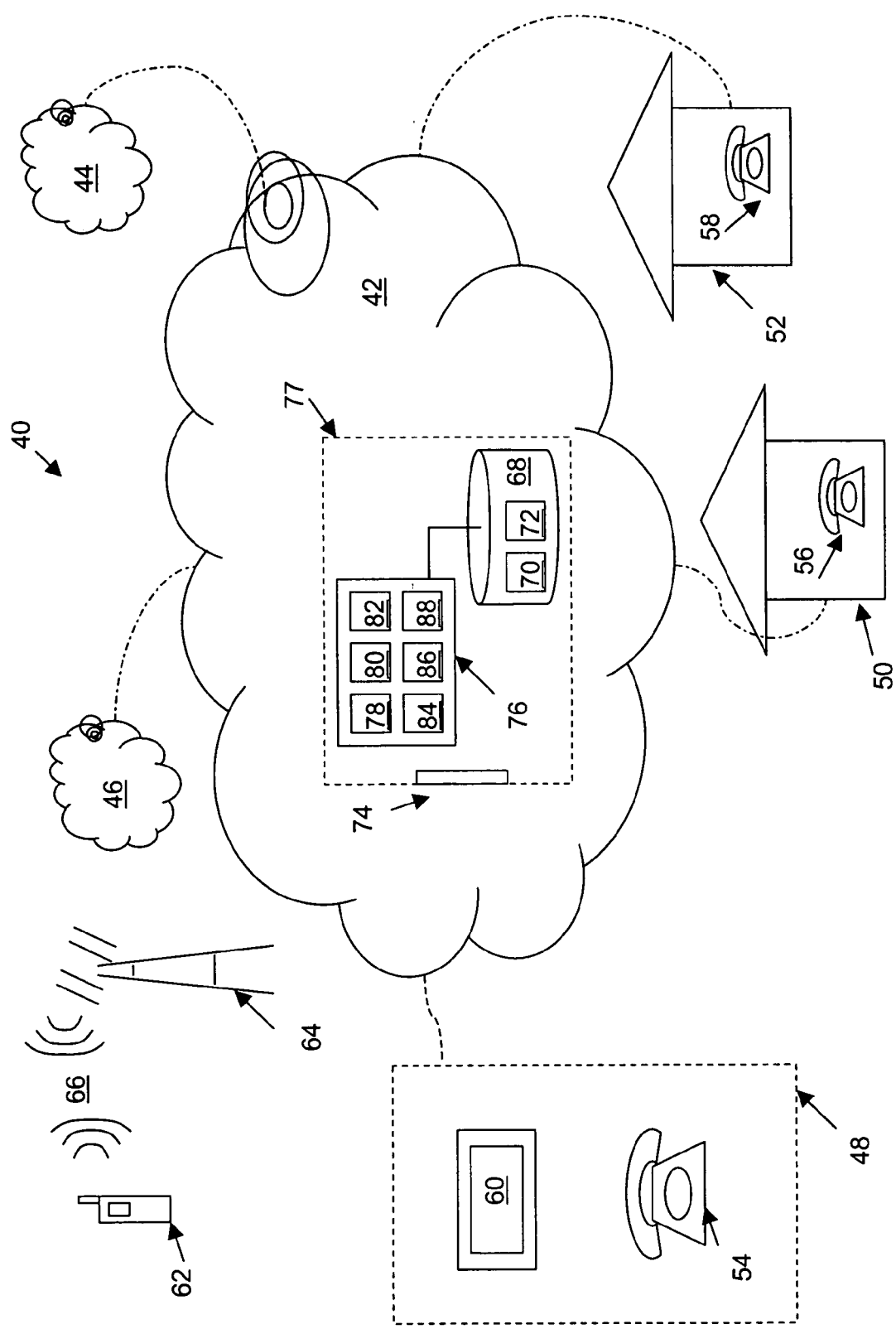
FIG. 2 shows one embodiment of a wireless account management system that incorporates teachings of the present disclosure.

For example, a system like the one depicted in FIG. 2 may allow the user to place and receive business calls for multiple clients and personal calls with a single device. The system may also provide a relatively transparent mechanism for categorizing and appropriately indicating an account code for each of those calls. The account code may indicate how a given call is to be billed. For example, a user may elect to have a first call billed to one sub account and a second call billed to a different sub account.

In some cases, the account code may be more akin to a memo or note. In such an embodiment, the account code may not actually impact how a call is billed. The account code may instead be used to remind the user of some fact about the call. For example, a subscriber may make a call to a friend on the friend's birthday. The user may add an account code to the call that indicates that the call was made to tell the friend to have a happy birthday. In such an embodiment, the user may later receive a wireless service bill that includes an indication of the applied account code. For example, the bill may have a line item entry for the call and a textual note under the line item that says "call to friend to say happy birthday."

As such, an account code may be akin to a routing number on the bottom of the check—identifying the account to bill for a call—and/or akin to a memo field on a check—providing a convenient mechanism to a user to track the purpose of a given call. In some embodiments, the user may key-in or otherwise input an account code identifying the appropriate account to be billed for a call. The code could include, for example, numbers, letters, words, phrases, utterances, some other account identification, and/or a combination thereof.

In some embodiments, the system may operate in a near-automatic mode—making its own decisions about what account code to apply to a call based on, for example, location or the device address of the other party. In such an embodiment, the system may allow for user override of the system's presumed account coding decisions. Systems and methods incorporating teachings of the present disclosure may be better understood by reference to the included Figures.

Figure 1:
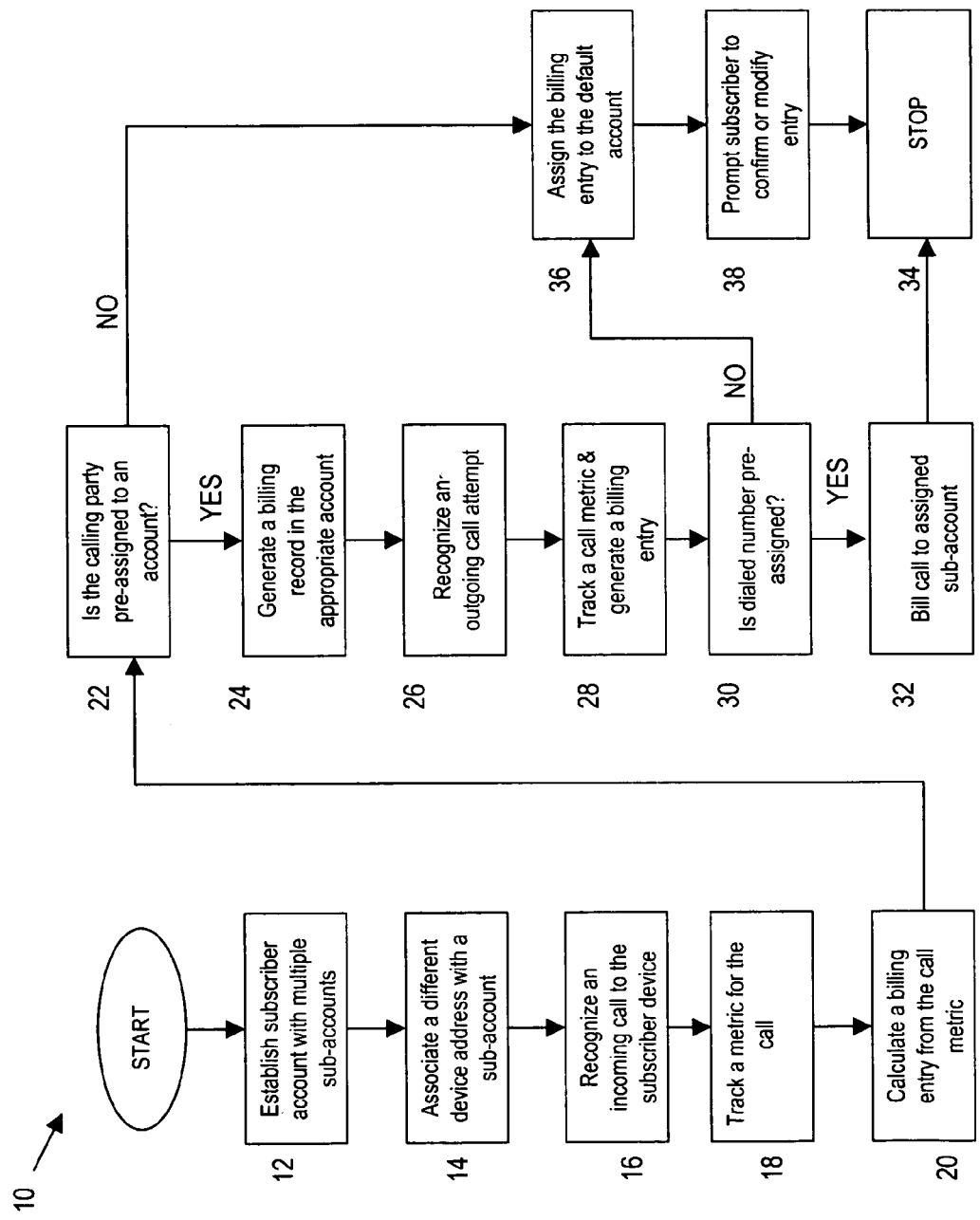
FIG. 1 presents a flow diagram for a multiple account management process incorporating teachings of the present disclosure.

As mentioned above, FIG. 1 presents a flow diagram for a multiple account management process 10 incorporating teachings of the present disclosure. At step 12, a subscriber may establish a wireless service account, which may have multiple sub-accounts. The sub-accounts may include, for example, personal accounts and business accounts. And, in some embodiments, a sub-account may facilitate the creation and/or management of additional sub-accounts. A subscriber may, for instance, be employed as a consultant and may have three primary clients that are willing to reimburse the consultant for incurred communication costs. The consultant may elect to establish a business sub-account with at least three appended accounts. As such, calls made and/or received in connection with work performed for each of the consultant clients may be billed to an appropriate appended account. Though the various accounts discussed above are described as having some level of association and/or integration, the accounts may also be implemented as stand alone accounts.

In some embodiments, this billing/accounting function may be performed in a near transparent way. For example, in operation, a device address for other communication devices and/or resources may at step 14 be linked to or associated with various ones of the account codes created at step 12. The device address may include an electronic mail address, an Instant Messaging address, a Short Messaging Service address, an Enhanced Messaging Service address, a Multimedia Messaging Service address, a Uniform Resource Locator (URL), and/or a wireless telephone number. Depending on implementation detail, this association may occur prior to a call, during a call, and/or after a call.

At step 16, an incoming call to a wireless enabled device of the subscriber may be recognized and, at step 18, a metric for the call may be tracked. The metric may include, for example, a call duration, a calling time, a roaming indicator, a long distance indicator, an amount of data communicated, and a call type indicator. By way of example, call types could include an information network access call, an electronic mail message, an Instant Messaging message, a Short Messaging Service message, an Enhanced Messaging Service message, a Multimedia Messaging Service message, a Voice over Internet Protocol call, and/or a wireless telephone call.

At step 20, the tracked metric may be considered as a part of calculating a billing entry for the call. At step 22, the device address of the calling device, which may have been received as Caller Identification (Caller ID) information, may be compared against the device addresses that were pre-assigned to at least one of the account codes established at step 12. If the device address had been pre-assigned, the billing entry calculated at step 20 may be recorded at step 24 and associated with an appropriate account—an account associated with the calling device address.

At step 26, an outgoing call attempt from a subscriber device may be recognized. A call metric may be tracked for the call and a billing entry for the call may be generated. At step 30, the dialed number of the outgoing call may be compared against the device addresses that were pre-assigned to the account codes established at step 12. If the dialed number was pre-assigned, the billing entry calculated at step 28 may be recorded at step 32 and associated with the appropriate account—an account associated with the dialed number. And, process 10 may progress to stop at step 34.

If at step 22 and/or 30, a device address for a calling or called device was not found in the list of pre-assigned addresses, process 10 may progress to step 36. At step 36, a calculated billing entry may be assigned a default account code identified by the subscriber. At step 38, the subscriber may be prompted and/or allowed to review, confirm, and/or modify the default account assignments. In some cases, this review function may be available for pre-assigned calls as well. For example, a subscriber may log on to a password protected website, may be presented with a graphical user interface (GUI) that shows how various calls have been assigned, and may be given an opportunity to modify or confirm the account assignments. The process may then progress to stop at step 34.

It will be understood that the ordering of the above-described steps may be changed. The associating of a given address to a selected account may, for example, occur at account set-up, just prior to the placing and/or receiving of a call, during a call, just after a call, at some later time, and/or combinations thereof. Moreover, the various steps of process 10 may be performed by one or more system components, which may be remote and/or local to the user.

A system implementing some or all of process 10 may be embodied within a cellular network node, a Public Internet node, a Public Switched Telephone Network (PSTN) node, a cable network node, an enterprise network node, some other communication network node, a cellular telephone, some other consumer device, and/or a combination thereof. For example, with at least a partial cellular telephone implementation, a user may store multiple contact lists linked to the established wireless accounts and sub-accounts. When someone calls, the called cellular telephone may compare the caller identification (Caller ID) information associated with the call to the contacts stored in the phone's address book. If the phone "recognizes" the calling party as "assigned to sub-account #1", the telephone may facilitate proper accounting of the call. Similarly, the phone may recognize and account for outgoing calls in much the same manner.

As mentioned above, FIG. 2 shows one embodiment of a wireless account management system that incorporates teachings of the present disclosure. As depicted, system 40 may include a communication network 42, which may include the PSTN, a cable network, a wireless service provider network, and/or some other network capable of supporting the communication of packetized information and/or point-to-point connections. Network 42 may be communicatively coupled to other networks like Public Internet 44 and cellular network 46.

In some embodiments, network 42 may provide telecommunication services to several subscribers. As shown, network 42 is communicatively coupled to premises 48, 50, and 52, and each of these premises has at least one telephone station identified as telephones 54, 56, and 58, respectively. In addition to the depicted telephones, a given subscriber may have other electronic devices capable of communicating information. For example, the subscriber associated with premises 48 may have a computer 60 and wireless communication device 62, which may be capable of communicating with a node 64 of cellular network 46. Wireless communication device 62 may be capable of Radio Frequency communication 66 that employs a 2.5 G mobile technology like GPRS or EDGE. Device 62 may also employ higher bandwidth offerings like 3 G/UMTS and may be capable of data calls (including email, messaging, browsing, etc.) as well as voice calls.

The subscriber of premises 48 may have established a wireless services account that allows for the supporting and managing of multiple sub-accounts. As depicted in FIG. 2, the network infrastructure supporting this account may actually be located within the PSTN and may include some level of wireless/wireline billing integration. In operation, system 40 may rely on memory 68 to maintain account files 70 and 72, which may represent sub-accounts established by the subscriber. These account files may store billing entries for their respective accounts as well as maintaining lists of associated device addresses. For example, device 62 may receive a call from telephone 56. The telephone number of telephone 56 may be associated with account file 70, and any charge for the call may be entered into a ledger maintained in account file 70. Similarly, device 62 may engage in a browsing session with a website accessible via Public Internet 44. The URL for the website may be associated with account file 72, and any charge for the data call may be entered into a ledger maintained in account file 72.

In operation, a call signal may be received via a network interface 74. The call signal may be in response to or associated with a desire to complete a call to or from device 62 and may be passed to a network node like computing platform 76, which may be implemented as one or more servers, computing devices, engines, mechanisms, and/or some other combination of hardware, software, and firmware. In some embodiments, platform 76 may be executing code to effectuate the features of a multiple account management system 77, and the call signal may include call party information and a call metric. The call party information may include, for example, device addresses like telephone numbers for the devices involved in the call. The call metric information may include, for example, a call duration value, a calling time, a roaming indicator, a long distance indicator, an amount of data communicated, a call type indicator, and/or a combination thereof. In embodiments that rely on the wireless device to make "bill to this account" decisions, the call metric may also include a specific account code.

Whatever the makeup of the call signal, information may be passed to billing engine 78, which may calculate a billing entry for the call. In some embodiments, some portion of the signal may also be communicated to an account code generator 80. Account code generator 80 may be capable of determining an account code for a given call by recognizing that a device address associated with the wireless call is pre-assigned to a subscriber sub-account. Depending on implementation detail, account code generator 80 may also be capable of querying device 62 and requesting input of an appropriate account code for the call triggering the call signal.

Platform 76 may also include an output engine 82, which may be capable of initiating presentation of account information within a graphical user interface GUI accessible by the subscriber via a password protected website. For example, the subscriber of premises 48 may make calls with device 62 and may then access an account GUI from computer 60. In some embodiments, the subscriber may be able to modify the coding assignments made by system 77 using a drag and drop like feature. Bill modification engine 84 may be responsive to these instructions and may effectuate them by modifying account files 70 and 72.

In an embodiment allowing web-based modification of sub-account coding, the subscriber may be able to confirm the appropriateness of proposed account code allocation. An invoicing engine 86 may recognize this confirmation and may output an actual electronic and/or hard copy invoice to the subscriber. The multiple account code and confirmed invoice may make reimbursement and/or expensing processes for the subscriber much simpler. As mentioned above, the multiple account codes may allow a given call to be linked to one of several different billable sub accounts. The account codes may in addition or alternatively allow for inclusion of a note or memo field in a billing entry for a given call.

In an account code billing embodiments, sub-accounts may be established with different use restrictions and/or different amounts of available minute blocks. For example, a given sub-account may not "accept" charges for data calls. If the subscriber indicates that a data call should charged to that sub-account, the subscriber may be notified of the current sub-account use limitation. The subscriber may be prompted to re-assign billing for the call and/or indicate a desire to override the sub-account rule.

Given the potential complexity of system 77, it may be advantageous to include an administrator access engine 88, which may allow for remote and/or local management of system 77 and platform 76. The above-description focuses on a platform supporting multiple engines. Other embodiments may employ more, less, and/or different engines, mechanisms, and servers, to implement the features and functions of a multiple account management service without departing form the teachings of the present disclosure.

For example, computing platform 76 may have access to a computer readable medium holding computer-readable data capable of directing platform 76 and related devices to maintain information representing a plurality of billable accounts for a single wireless enabled device, to recognize an event trigger signaling a request to place a telephone call from the single wireless enabled device, to initiate completion of the telephone call, to determine an appropriate account from the plurality of billable accounts to be billed for the telephone call, and to generate a billing record for the telephone call in the appropriate account.

The computer-readable medium may also have additional computer-readable data to recognize an incoming call trigger signaling a request to place a telephone call to the single wireless enabled device, to initiate completion of the incoming telephone call, to determine an account from the plurality of billable accounts to be billed for the incoming telephone call, and to generate a billing record for the incoming telephone call in the account.

Figure 3:
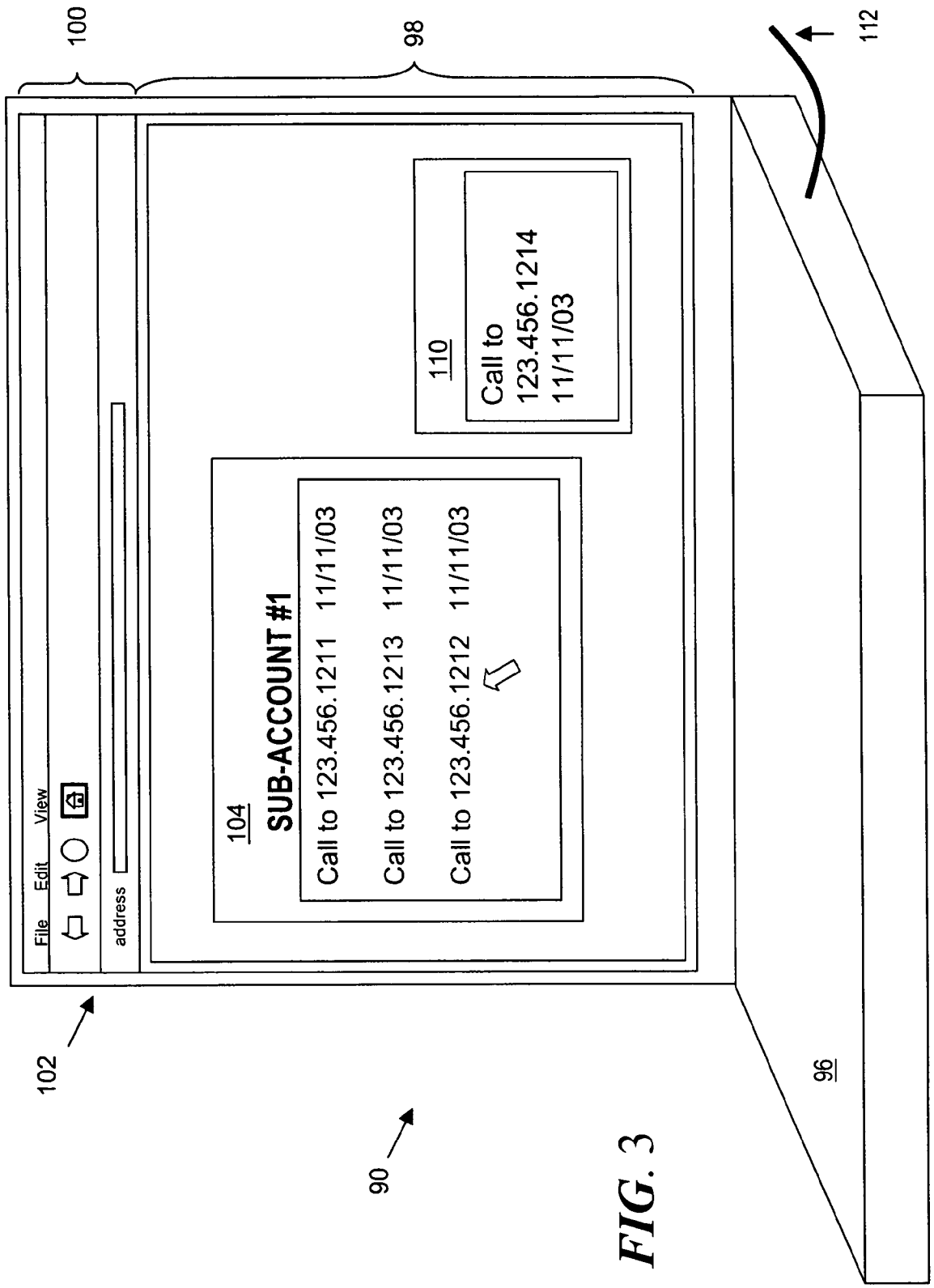
FIG. 3 illustrates a piece of computing equipment and a graphical user interface that may be used to implement teachings disclosed herein.

As mentioned above, FIG. 3 illustrates a piece of computing equipment and a graphical user interface that may be used to implement teachings disclosed herein. As shown, CPE 90 appears to be a laptop computer with a surface 96 that may include a keyboard, a mouse, arrow keys, and/or some other form of user interface. The user interface may be capable of receiving user inputs that could indicate, for example, a desire to modify a proposed accounting of a call.

As shown, CPE 90 presents a browsing environment 98 and a browser bar 100 on a display 102. Within environment 98, a user may be presented with a GUI element 104 representing an established sub account #1 and a list of calls "charged" to that account. As shown, the last entry may represent a call placed to 123.456.1212. The user has selected this entry by pointing an on-screen arrow at the entry. In operation, the user may now elect to modify, confirm, or otherwise act on the entry. For example, the user may know that the identified call should be "charged" against the default account identified by GUI element 110, and the user may drag the entry to GUI element 110 to indicate the user's desire to change the billing allocation for that call.

The user may also want to add a memo type account code to the identified call. For example, the call may have been made in connection with a specific Project XYZ being worked on by the user. The user may want to use a memo type account coding feature to append a reminder message to the call entry. The reminder may include a textual, visual, audio, and/or graphic indication explaining that the call was "made in connection to Project XYZ".

Various types of information may be included in GUI elements 104 and 110 including, for example, whether the entry represents a call to or from the subscriber, the duration of the call, the type of call, the date of the call, whether the call accounting is confirmed, whether the call has an assigned billing account code, whether the call has an assigned memo account code, the total charge to a given sub-account, the remaining minutes within a block assigned to a given sub-account, or some combination thereof. Also depicted in connection with CPE 90 is a network connector 112. Network connector 112 may represent, for example, coaxial cable, twisted pair, fiber, an RF link such as GPRS or 802.11(x), and/or some other linking mechanism forming at least a part of a link communicatively coupling CPE 90 to a broader network and/or other devices.

Figure 4:
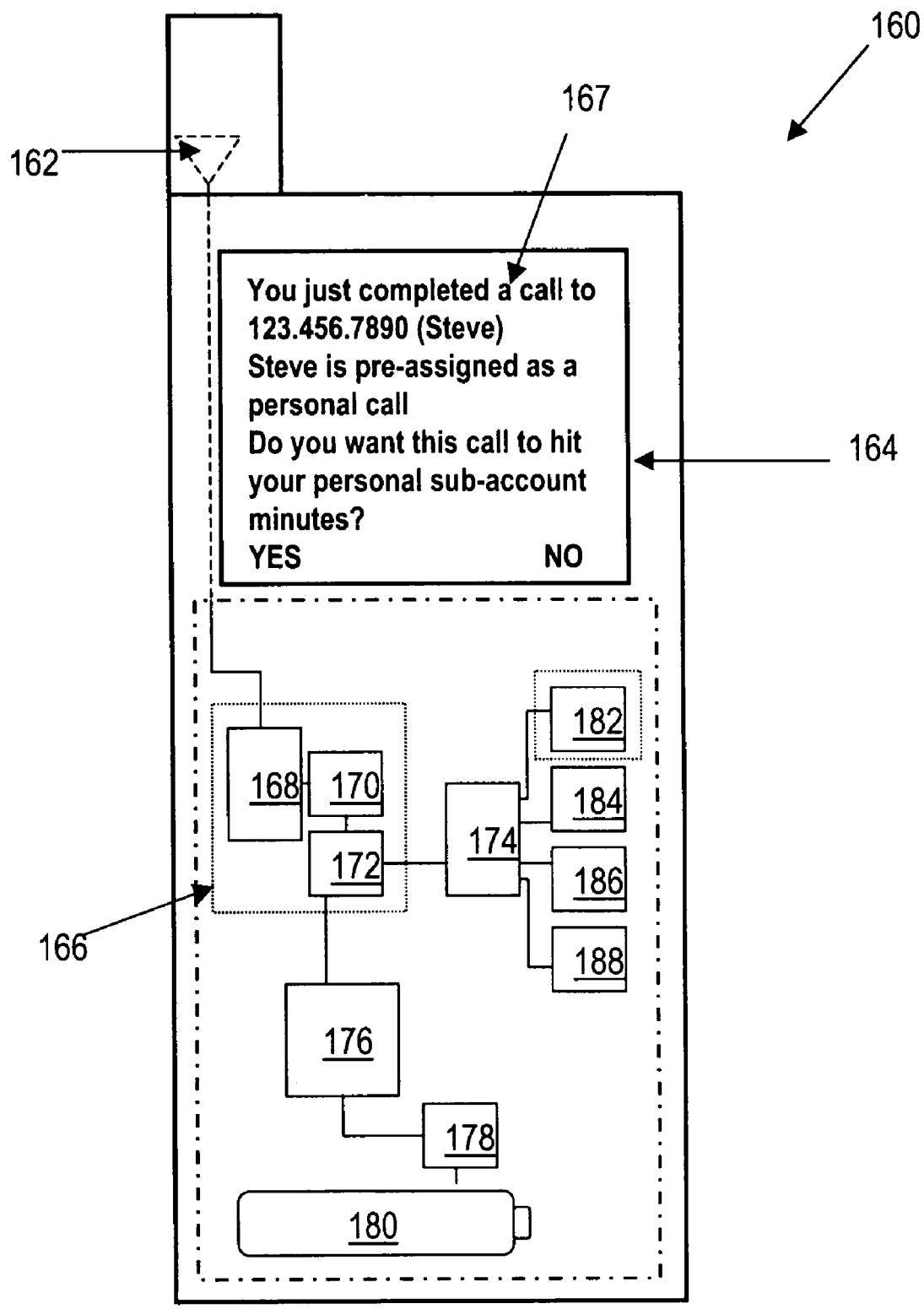
FIG. 4 depicts a partial cut away view of a wireless enabled device that may execute a local application and assist in implementing teachings of the present disclosure.

As mentioned above, FIG. 4 depicts a partial cut away view of a wireless enabled device that may execute a local application and assist in implementing teachings of the present disclosure. As shown, the device may be a cellular telephone 160. In other embodiments, the device may take the form of some other wireless communication device, including, for example, other telephonic devices, smart telephones, personal digital assistants (PDA's), Blackberry™-like electronic mail devices, and/or some combination thereof.

In the depicted embodiment, telephone 160 includes several integrated circuits on a circuit board, an antenna 162, and a liquid crystal display 164 presenting a question 167 to the user seeking to confirm that a recent call should be billed to the "personal use" sub-account. The components of telephone 160 could include any of several combinations of components. As depicted, telephone 160 includes a wide area wireless platform 166, which may be, for example, a GPRS and/or CDMA module. As shown, platform 166 includes a wide area wireless transceiver 168, front-end circuitry 170, and dual core processor 172. Front-end circuitry 170 may help ensure that the baseband electronics will work well with transceiver 168. Dual core processor 172 may include, for example, a Digital Signal Processing (DSP) core as well as RISC or ARM capabilities. In some embodiments, the components of telephone 160 may use dedicated hardware and DSP firmware to help provide advanced functionality.

Platform 160 may be communicatively coupled to an application engine 174, which could be, for example, a Dragonball processor, and a power circuit 176, which may manage among other things a battery circuit 178. In some embodiments, battery circuit 178 may keep track of the power available from battery 180. Application engine 174 may be communicatively coupled to several different components and may provide those components with additional processing capabilities. Example components may include a local area RF transceiver 182, which may be Bluetooth-enabled, Wi-Fi enabled, etc. Other components might be an image sensor 184, memory module 186, and peripheral controller 188, which may manage keypad, LCD, CODEC, IrDA, and other functionality. One skilled in the art will recognize that the many of the above described components could be combined or broken out into other combinations and that the memory could include onboard and added memory components including RAM, Flash, smart media, and others.

In various embodiments, the telephones, computers, devices, servers, and/or platforms, described above, may take forms including wireless and cordless phones, personal digital assistants, cellular telephones, mobile telephones, laptop computers, desktop computers, mainframes, PSTN switches, Ethernet switches, routers, gateways, hardware, firmware, software, work stations, other options having some level of computing capability, and/or a combination thereof.

The methods and systems described herein provide for an adaptable implementation. Although certain embodiments have been described using specific examples, it will be apparent to those skilled in the art that the invention is not limited to these few examples. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A call accounting method, comprising:
   linking a first account and a second account to a wireless enabled device of a wireless service subscriber;
   associating a device address of a different device with the first account;
   receiving a call metric associated with a call between the wireless enabled device and the different device;
   generating a billing entry associated with the call based on the call metric;
   storing a user-specified reminder message in the billing entry, the user-specified reminder message including audio indications;
   assigning the billing entry to the first account;
   requesting the wireless service subscriber to confirm the assignment of the billing entry to the first account;
   receiving input from the wireless service subscriber requesting a reassignment of the billing entry associated with the call from the first account to the second account; and
   notifying the wireless service subscriber that the billing entry has not been reassigned to the second account based on a use restriction associated with the second account.

2. The method of claim 1, further comprising:
   receiving a signal confirming the assignment of the billing entry to the first account.

3. The method of claim 1, wherein the call comprises a wireless data call.

4. The method of claim 1, wherein the call originates from the wireless enabled device.

5. The method of claim 1, wherein the first account represents a personal use account billed to the wireless service subscriber and the second account represents a business use account.

6. The method of claim 1, further comprising associating the device address of the different device with the first account in response to a trigger input associated with the call.

7. The method of claim 6, wherein the trigger input comprises information received from the wireless service subscriber in response to receiving a request for an identification of an account to be billed for the call.

8. The method of claim 7, wherein the request is sent to a communication address of the wireless enabled device, the communication address selected from the group consisting of an electronic mail address, an instant messaging address, a short messaging service address, an enhanced messaging service address, and a multimedia messaging service address.

9. The method of claim 1, further comprising generating a wireless service bill for the wireless service subscriber, wherein the wireless service bill comprises first account billing information and second account billing information.

10. The method of claim 1, wherein the call metric comprises an amount of data communicated and a call type indicator, wherein the call type indicator identifies a call as a data call.

11. The method of claim 10, wherein the data call comprises one or more of an information network access, an electronic mail message, an instant messaging message, a short messaging service message, an enhanced messaging service message, and a multimedia messaging service message.

12. The method of claim 1, wherein the graphical user interface supports a drag-and-drop feature indicating the requested reassignment.

13. The method of claim 1, further comprising:
   recognizing a call attempt from the wireless enabled device;
   determining that a dialed number of the call attempt does not have an associated account; and
   prompting the wireless service subscriber to input a selection of one of the first account and the second account to be associated with the dialed number.

14. A system, comprising:
   a memory maintaining a first billing account and a second billing account associated with a single wireless device of a subscriber;
   an interface configured to receive a call metric at least partially describing a call involving the single wireless device, the interface further configured to receive a call type indicator associated with the call, wherein the call type indicator indicates that the call is one of an instant messaging message, a short messaging service message, an enhanced messaging service message, and a multimedia messaging service message;

an account code generator communicatively coupled to the interface and operable to receive from the single wireless device a first account code after completion of the call, the first account code associated with the first account;

a billing engine communicatively coupled to the interface and the memory, the billing engine operable to generate a billing entry for the call from the call metric, the billing engine operable to assign the billing entry to the first account, and the billing engine further operable to determine, in response to receiving a request to reassign the billing entry to the second account, whether to add the billing entry to the second account based on a use restriction associated with the second account; and an output engine communicatively coupled to the billing engine, the output engine operable to initiate presentation of account information within a graphical user interface accessible by the subscriber, the output engine operable to store a user-specified memo in the billing entry for the call, the user-specified memo including audio indications, the output engine operable to request the subscriber to confirm the assignment of the billing entry to the first account, and the output engine operable to notify the subscriber that the billing entry has not been assigned to the second account based on the use restriction associated with the second account.

15. The system of claim 14, further comprising a cellular network node implementing the memory, the interface, and the billing engine.

16. The system of claim 14, wherein the call metric comprises the account code, wherein the account code identifies the account selected and a billing code, the billing code comprising information selected from the group consisting of a calling time, a roaming indicator, a long distance indicator, and an amount of data communicated.

17. The system of claim 14, wherein the account code generator is further operable to determine the account code by recognizing that a device address of another device associated with the call is pre-assigned to a particular account.

18. The system of claim 14, wherein the output engine is operable to initiate presentation of account information within a graphical user interface accessible by the subscriber via a password protected website.

19. The system of claim 18, wherein the graphical user interface supports a drag-and-drop feature to modify the account information.

20. A system supporting account codes for a single wireless enabled device, the system comprising:

a housing component at least partially defining an exterior surface of the single wireless enabled device;

a memory located within an enclosure at least partially formed by the housing component, the memory maintaining a first account code associated with a first account and a second account code associated with a second account;

a user interface operable to receive a user input indicating a desire to engage in a call with another party;

an account code selector responsive to the user interface and operable to:

select the first account code based on a billing code and a call type indicator indicating that the call is one of an instant messaging message, a short messaging service message, an enhanced messaging service message, a multimedia messaging service message, a voice over Internet protocol (VoIP) call, and a wireless telephone call, wherein the first account code includes a user-specified memo, the user-specified memo including audio indications; and select the second account code based on second input to reassign a billing entry from the first account to the second account; and an output engine operable to communicate account codes to a node of a wireless network, wherein the user interface is further operable to request confirmation of an assignment of the billing entry to the first account and to display a notification that the billing entry has not been assigned to the second account based on a use restriction associated with the second account.

21. The system of claim 20, wherein the single wireless enabled device is selected from a group consisting of a cellular telephone, a smart telephone, a personal digital assistant, a wireless electronic mail device, a VoIP device, and a computer having wireless communication capabilities.

22. The system of claim 20, wherein the account code selector determines the account code associated with the call by requesting a user of the single wireless enabled device to indicate a desired account code.

23. The system of claim 20, wherein the memory maintains links associating a first set of contact information to the first account code and associating a second set of contact information to the second account code.

24. The system of claim 23, wherein the account code selector determines the account code associated with the call by comparing received caller identification information to the first set of contact information.

25. A computer-readable medium comprising computer-executable instructions that, when executed, cause a computer to:

link a first account and a second account to a wireless enabled device of a wireless service subscriber;

associate a device address of a different device with the first account;

receive a call metric associated with a call between the wireless enabled device and the different device;

generate a billing entry associated with the call based on the call metric;

store a user-specified memo in the billing entry, the user-specified memo including audio indications;

assign the billing entry to the first account;

request the wireless service subscriber to confirm the assignment of the billing entry to the first account;

receive input from the wireless service subscriber requesting a reassignment of the billing entry associated with the call from the first account to the second account; and notify the wireless service subscriber that the billing entry has not been reassigned to the second account based on a use restriction associated with the second account.

26. The system of claim 20, wherein the billing code comprises call specific information selected from the group consisting of a call duration, a calling time, a roaming indicator, a long distance indicator, and an amount of data communicated.

27. The computer-readable medium of claim 25, wherein the user-specified memo includes a description of a call purpose associated with the call.

28. The computer-readable medium of claim 27, wherein the user-specified memo further includes one or more of textual indications, and visual indications.

29. The computer-readable medium of claim 25, wherein the billing entry is assigned to the first account based at least in part on caller identification information associated with the different device.

30. The system of claim 14, wherein the account is selected based at least in part on caller identification information associated with the call.

31. The call accounting method of claim 1, further comprising reassigning the billing entry to a third account in response to determining that the use restriction is associated with the second account.

32. The call accounting method of claim 31, wherein the use restriction comprises a type of call.

33. The call accounting method of claim 31, wherein the use restriction comprises remaining minutes.

34. The call accounting method of claim 1, further comprising receiving input from the wireless service subscriber to override the use restriction.

* * * * *